United States Patent [19]

Silberberg

[11] 4,342,846
[45] Aug. 3, 1982

[54] BLENDS OF A POLYESTER RESIN AND IMPACT RESISTANT INTERPOLYMER

[75] Inventor: Joseph Silberberg, Brooklyn, N.Y.

[73] Assignee: Stauffer Chemical Company, Westport, Conn.

[21] Appl. No.: 241,876

[22] Filed: Mar. 9, 1981

[51] Int. Cl.³ ............................................. C08L 51/00
[52] U.S. Cl. .................................... 525/64; 525/166; 525/175; 525/176; 525/177; 525/243
[58] Field of Search ................... 525/63, 64, 166, 175, 525/176, 177

[56] References Cited

U.S. PATENT DOCUMENTS 3,919,353  11/1975  Castelnuovo et al. ............... 525/69
4,148,842  4/1979  Yu ..................................... 525/148

OTHER PUBLICATIONS

Polyesters, vol. 1, Saturated Polymers, Goodman et al., (1965), p. 141, Plastic Institute, London.

Primary Examiner—J. Ziegler
Attorney, Agent, or Firm—Richard P. Fennelly

[57] ABSTRACT

Blends of a polyester resin, such as polyethylene or polybutylene terephthalate, and an impact resistant interpolymer comprising crosslinked acrylic or methacrylic rubber, crosslinked styrene-acrylonitrile, and uncrosslinked styrene-acrylonitrile polymer components are disclosed.

9 Claims, No Drawings

BLENDS OF A POLYESTER RESIN AND IMPACT RESISTANT INTERPOLYMER

BACKGROUND OF THE INVENTION

1. Field of the Invention

The present invention relates to blends of a polyester resin, such as polybutylene or polyethylene terephthalate, and an impact resistant interpolymer. The resulting blends find utility as a raw material in the fabrication of formed parts.

2. Description of the Prior Art

Thermoplastic polyester resins which are based on the reaction of aliphatic or aromatic dicarboxylic acids and aliphatic or cycloaliphatic diols are tough materials which find principal utility as an injection molding material for the formation of molded parts having good resistance to friction and wear. Various attempts have been made to improve the impact resistance of such materials. For example, in U.S. Pat. No. 3,919,353 to L. Castelnuovo et al. it is suggested that the polyester resin be blended with a crosslinked polymer having a second order transition temperature lower than 0° C. which is grafted with or which contains polar and/or polarizable monomers or groups. Examples of such polymers are polybutadiene, butadiene-styrene copolymers, butadiene-acrylonitrile copolymers, ethylene-propylene rubbers, polyisobutene, and polyisoprene. Examples of polar grafting monomers or polarizable groups include the acrylic and methacrylic esters, vinyl acetate, acrylonitrile, styrene, and the alkyl styrenes.

Various acrylate based multistage interpolymers which differ from the impact resistance additive proposed by Castelnuovo et al. are known. For example, U.S. Pat. No. 3,655,826 to R. P. Fellmann et al. proposes a three-stage interpolymer which is useful as an impact resistance improver for a variety of thermoplastic polymers without naming thermoplastic polyester resins as an example of a suitable substrate resin. Another three-stage interpolymer comprising acrylate, styrene, and acrylonitrile moieties is described in U.S. Pat. No. 3,944,631 to A. J. Yu et al. This interpolymer has been described in the prior art as an impact improvement additive for polycarbonate resins (U.S. Pat. No. 4,148,842), for blends of chlorinated vinyl chloride and vinyl chloride polymers (U.S. Pat. No. 4,160,793), and for vinyl chloride polymers (U.S. Pat. No. 4,168,285).

SUMMARY OF THE PRESENT INVENTION

The present invention relates to blends of: (1) a thermoplastic polyester resin, such as polybutylene or polyethylene terephthalate; and (2) an impact resistant interpolymer comprising crosslinked (meth)acrylate, crosslinked styrene-acrylonitrile and uncrosslinked styrene-acrylonitrile polymer components. The interpolymer composition is described in U.S. Pat. No. 3,944,631 to A. J. Yu et al. When the amount of polyester resin predominates in the blend, the interpolymer acts as an impact modifier and processing aid for the normally tough, but relatively impact sensitive polyester resin. At relatively high levels of the interpolymer, the polyester resin functions as a modifier to increase the strength and modulus of the blend as compared to presence of the interpolymer along, while retaining good heat distortion temperature, elongation, and impact resistance characteristics.

Description of Preferred Embodiments

The blends of the present invention comprise: (1) a polyester resin; and (2) an impact resistant interpolymer comprising crosslinked (meth)acrylate, crosslinked styrene-acrylonitrile, and uncrosslinked styrene-acrylonitrile polymeric components.

The term "polyester" resin, as used herein, is intended to encompass those thermoplastic polyester resins which are made by the condensation polymerization of aliphatic or aromatic dicarboxylic acids and aliphatic or cycloaliphatic diols. Such materials are well known and are described in the literature at a number of places including Modern Plastics Encyclopedia, 1977–78, pp. 56,61 and 62 and Handbook of Plastics and Elastomers, C. A. Harper, ed., McGraw-Hill, Inc., 1975, pp. 1–87 to 88. Representative polymers of this type include polyethylene and polybutylene terephthalate. Commercially available resins of this type include those sold under the following trademarks: VALOX (General Electric); CELANEX (Celanese); and GAFITE (GAF Corp.). The polyester resin that is selected for use in the present invention can contain any of the additives conventionally used in such resins including fillers (e.g., glass, talc, mica, clay, calcium carbonate, wollastonite, carbon fibers, mineral fibers, etc.), impact modifiers, antioxidants, etc.

The terminology "impact resistant interpolymer comprising crosslinked (meth)acrylate, crosslinked styrene-acrylonitrile, and uncrosslinked styrene-acrylonitrile components" is meant to encompass the type of interpolymer compositions described in U.S. Pat. No. 3,944,631 to A. J. Yu et al. These interpolymer compositions are formed by the following type of three-step, sequential polymerization process:

1. emulsion polymerizing a monomer charge (herein designated "(meth)acrylate", for the purposes of the present invention), of at least one monomer selected from the $C_2$–$C_{10}$ alkyl acrylates, $C_8$–$C_{22}$ alkyl methacrylates or compatible mixtures thereof, in an aqueous polymerization medium in the presence of an effective amount of a suitable di- or polyethylenically unsaturated crosslinking agent for such a type of monomer, with the $C_4$–$C_8$ alkyl acrylates being the preferred (meth)acrylate monomers for use in this step;
2. emulsion polymerizing a monomer charge of styrene and acrylonitrile in an aqueous polymerization medium, also in the presence of an effective amount of a suitable di- or polyethylenically unsaturated crosslinking agent for such monomers, said polymerization being carried out in the presence of the product from Step 1 so that the crosslinked (meth)acrylate and crosslinked styrene-acrylonitrile components form an interpolymer wherein the respective phases surround and penetrate one another; and
3. either emulsion or suspension polymerizing a monomer charge of styrene and acrylonitrile, in the absence of a crosslinking agent, in the presence of the produce resulting from Step 2. If desired, Steps 1 and 2 can be reversed in the above-described procedure.

This product, which is used as the impact resistant interpolymer component in the blends of the present invention generally comprises from about 5% to about 50%, by weight, of the above-identified crosslinked (meth)acrylate component, from about 5% to about 35%, by weight, of the crosslinked styrene-acrylonitrile component and from about 15% to about 90%, by weight, of the uncrosslinked styrene-acrylonitrile component. It contains little graft polymerization between the styrene-acrylonitrile copolymer components and the crosslinked (meth)acrylate polymeric component. Further details regarding this type of polymer composition can be found in U.S. Pat. No. 3,944,631 to A. J. Yu et al., which is incorporated herein by reference.

The blends of the present invention can be formulated in weight ratios of polyester resin to interpolymer resin of from about 10:90 to about 90:10 depending upon the precise physical properties desired in the end product. Generally, blends containing amounts of polyester and interpolymer in the range of from about 30:70 to about 70:30 are less desired since the blend tends to lose some of the respective desired characteristics of either of its constituents. Therefore, blends of from 10:90 to 30:70 and 70:30 to 90:10 are most desired.

Blending can be achieved by any of the well-known polymer blending techniques, such as a two-roll or Banbury mixing, single or multiple screw extrusion, or any other method which applies sufficient heat (e.g., 200° to 275° C., preferably 225° C. to 250° C.) and shear to the respective polymeric ingredients (polyester resin and interpolymer additive) to obtain a satisfactory blend in accordance with the present invention.

The present invention is further illustrated by the Examples which follow.

EXAMPLES 1-9

These Examples illustrate the fabrication of a number of blends in accordance with the present invention and illustrate various of their physical property characteristics.

A series of blends of polyester resin (VALOX 310 brand from General Electric) and the type of interpolymer described in U.S. Pat. No. 3,944,631 to A. J. Yu et al. were prepared along with two control compositions. The interpolymer contained 32%, by weight, crosslinked polybutyl acrylate, 10% by weight, of crosslinked styrene-acrylonitrile (73:27 weight ratio), and 58%, by weight, of uncrosslinked styrene-acrylonitrile (73:27 weight ratio). It was obtained from Stauffer Chemical Company (SCC-1004 brand).

The selected ingredient (in the case of each Control run) or ingredients were first oven dried at 110° C. for 2 hours. The samples that were selected for fabrication were as follows with the amounts being the weight proportions of the selected ingredient(s):

EXAMPLES 1-9 (cont'd.)

| Example | Polyester (VALOX 310 brand) | (SCC-1004 brand) |
|---|---|---|
| 1 (Control) | 0 | 100 |
| 2 | 10 | 90 |
| 3 | 25 | 75 |
| 4 | 40 | 60 |
| 5 | 50 | 50 |
| 6 | 60 | 40 |
| 7 | 75 | 25 |
| 8 | 90 | 10 |
| 9 (Control) | 100 | 0 |

The ingredients were extrusion compounded at about 220° C. in an extrusion apparatus having a 2.5 cm. barrel diameter, a 20/1 length to diameter ratio, with a 3:1 compression ratio standard taper screw turning at 50 rpm through a strand die. The extruded samples were dried overnight at 90° C. prior to being injection molded to form test plaques. The injection molding was performed on an injection molding machine from Boy Company.

Listed below are the extrusion and injection molding conditions noted for each sample:

EXAMPLES 1-9 (cont'd.)

| | Extrusion Conditions | |
|---|---|---|
| Example No. | Barrel Temp. Range (°C.) | Die Temp. (°C.) |
| 1 | 217–220 | 200 |
| 2 | 215–232 | 220 |
| 3 | 215–235 | 222 |
| 4 | 225–255 | 230 |
| 5 | 225–255 | 230 |
| 6 | 225–255 | 218 |
| 7 | 225–255 | 225 |
| 8 | 225–255 | 225 |
| 9 | 225–255 | 220 |

In the injection molding operation the barrel temperature for all samples was 210° C. except for the sample for Example 9 which was 250° C. The nozzle heater was set at approximately 50% time on. The injection pressure setting was adjusted for each sample to give proper mold fill.

The following physical properties were noted for each specimen:

EXAMPLES 1-9 (cont'd.)

| Example No. | Tensile Str. (1) (MPa) | Elongation at Break (1) (%) | Flexural Str. (2) (MPa) |
|---|---|---|---|
| 1 | 33.3 | 123 | 51.3 |
| 2 | 34.0 | 141 | 54.8 |
| 3 | 37.0 | 144 | 59.9 |
| 4 | 40.6 | 43 | 65.4 |
| 5 | 42.5 | 53 | 68.1 |
| 6 | 46.1 | 168 | 77.1 |
| 7 | 49.9 | 237 | 80.5 |
| 8 | 53.7 | 392 | 90.8 |
| 9 | 56.0 | 444 | 94.2 |

(1) ASTM D-638 with the following modifications: specimens were 0.32 cm. × 0.32 cm. in cross-section with a gauge length of 1.42 cm.
(2) ASTM D-790, Method I, Procedure B.

| Example No. | Flex Modulus (2) (GPa) | Izod Impact (3) (J/m) | Tensile Impact (4) (KJ/m$^2$) |
|---|---|---|---|
| 1 | 1.66 | 641 | 421 |
| 2 | 1.69 | 566 | 498 |
| 3 | 1.78 | 150 | 452 |
| 4 | 1.88 | 112 | 393 |
| 5 | 1.97 | 91 | 320 |
| 6 | 2.12 | 85 | 305 |
| 7 | 2.25 | 75 | 305 |
| 8 | 2.40 | 69 | 284 |
| 9 | 2.51 | 43 | 301 |

(2) ASTM D-790, Method I, Procedure B.
(3) ASTM D-256, Method A, using a 0.32 cm. thick specimen.
(4) ASTM D-1822, Specimen Type L.

EXAMPLES 1-9 (cont'd.)

| Example No. | Heat Deflection (5) Temp. (°C.) | Melt Viscosity (6) (poise) |
|---|---|---|
| 1 | 75.5 | 3200 |
| 2 | 77 | 2900 |
| 3 | 75.5 | — |
| 4 | 72 | 2500 |
| 5 | 70 | — |
| 6 | 77 | 2600 |
| 7 | 70 | — |

EXAMPLES 1-9 (cont'd.)-continued

| Example No. | Heat Deflection (5) Temp. (°C.) | Melt Viscosity (6) (poise) |
|---|---|---|
| 8 | 56 | 3200 |
| 9 | 53 | 3800 |

(5) ASTM D-648 measured at 1.82 MPa on specimen.
(6) measured at 1000 sec.$^{-1}$ and 230° C. in a capillary rheometer attachment on an INSTRON stress/strain testing machine.

The foregoing Examples set forth certain embodiments of the present invention but should not be construed in a limiting manner. The scope of protection for the present invention is set forth in the claims which follow.

What is claimed:

1. A blend comprising: (1) a polyester resin formed by reaction of a dicarboxylic acid and a diol; and (2) an impact resistant interpolymer comprising crosslinked (meth)acrylate, crosslinked styrene-acrylonitrile, and uncrosslinked styrene-acrylonitrile polymeric components.

2. A blend as claimed in claim 1 wherein the interpolymer comprises from about 5% to about 50%, by weight, of the (meth)acrylate component, from about 5% to about 35%, by weight, of the crosslinked styrene-acrylonitrile component, and from about 15% to about 90%, by weight, of the uncrosslinked styrene-acrylonitrile component.

3. A blend as claimed in claim 1 or 2 which comprises a weight ratio of polyester resin to interpolymer of from about 10:90 to about 90:10.

4. A blend as claimed in either claim 1 or 2 wherein the weight ratio of polyester resin to interpolymer is either from about 10:90 to about 30:70 or from about 70:30 to about 90:10.

5. A blend as claimed in either claim 1 or 2 wherein the (meth)acrylate component of the interpolymer is selected from the group consisting of the crosslinked $C_2$-$C_{10}$ alkyl acrylates, the crosslinked $C_8$-$C_{22}$ alkyl methacrylates, and compatible mixtures thereof.

6. A blend as claimed in either claim 1 or 2 wherein the (meth)acrylate component of the interpolymer is a crosslinked $C_4$-$C_8$ alkyl acrylate.

7. A blend as claimed in either claim 1 or 2 wherein the polyester resin is polyethylene terephthalate.

8. A blend as claimed in either claim 1 or 2 wherein the polyester resin is polybutylene terephthalate.

9. A blend as claimed in either claim 1 or 2 wherein the weight ratio of polyester resin to interpolymer is from about 10:90 to about 90:10 and the interpolymer comprises from about 5% to about 50%, by weight, of a crosslinked polybutyl acrylate component, from about 5% to about 35%, by weight, of the crosslinked styrene-acrylonitrile component, and from about 15% to about 90%, by weight, of the uncrosslinked styrene-acrylonitrile component.

* * * * *